(12) United States Patent
Barnes et al.

(10) Patent No.: US 12,166,883 B2
(45) Date of Patent: Dec. 10, 2024

(54) SYSTEM AND METHOD FOR DELEGATING AUTHORITY THROUGH COUPLED DEVICES

(71) Applicant: Google LLC, Mountain View, CA (US)

(72) Inventors: Calum Barnes, New York, NY (US); Tom Olick, Brooklyn, NY (US); Tamás Mágedli, Budapest (HU); David Arturo Lira Cuevas, New York, NY (US); Preston Holmes, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 49 days.

(21) Appl. No.: 17/553,078

(22) Filed: Dec. 16, 2021

(65) Prior Publication Data

US 2022/0123936 A1  Apr. 21, 2022

Related U.S. Application Data

(62) Division of application No. 16/518,127, filed on Jul. 22, 2019, now Pat. No. 11,240,031.

(Continued)

(51) Int. Cl.
*H04L 9/32* (2006.01)
*H04L 9/40* (2022.01)
(Continued)

(52) U.S. Cl.
CPC ......... *H04L 9/3213* (2013.01); *H04L 9/3247* (2013.01); *H04L 63/0807* (2013.01); *H04L 67/02* (2013.01); *H04W 12/06* (2013.01)

(58) Field of Classification Search
CPC . H04L 9/3213; H04L 9/3247; H04L 63/0807; H04L 67/02; H04L 67/12;
(Continued)

(56) References Cited

U.S. PATENT DOCUMENTS

| 9,621,355 B1 | 4/2017 | Ochmanski et al. |
| 10,044,723 B1 * | 8/2018 | Fischer ................. H04L 63/102 |

(Continued)

FOREIGN PATENT DOCUMENTS

| CN | 108464026 A | 8/2018 |
| EP | 3301960 A1 | 4/2018 |

OTHER PUBLICATIONS

To Understand IoT Authentication and Authorization You Need To Know 'OAuth 2.0', [online], [Retrieved Jul. 22, 2019] Retrieved from internet: <https://www.arrayent.com/2017/07/13/understand-iot-authentication-authorization-need-know-oauth-2-0/> 4 pages.

(Continued)

*Primary Examiner* — Henry Tsang
(74) *Attorney, Agent, or Firm* — Lerner David LLP (57) ABSTRACT

The present disclosure provides a system and method for delegating authority to cloud IoT devices, with such delegated authority enabling the cloud IoT devices to access second cloud services outside of a core network. The IoT device uses its IoT identity to obtain a token for accessing the second service within a predefined time window. The token may be used to access the second service without further authentication by the second service. Accordingly, the IoT device can take particular actions, such as downloading files, etc., during the predefined time window. After the predefined time window, the IoT device may no longer access the second service without obtaining another token.

18 Claims, 9 Drawing Sheets

Related U.S. Application Data (60) Provisional application No. 62/803,104, filed on Feb. 8, 2019.

(51) Int. Cl.
*H04L 67/02* (2022.01)
*H04W 12/06* (2021.01)

(58) Field of Classification Search
CPC . H04L 63/10; H04L 63/0876; H04L 63/0846; H04L 63/108; H04W 12/06; H04W 12/009; H04W 12/71; H04W 12/084; H04W 4/70; G06F 21/44; G06F 21/335
See application file for complete search history.

(56) References Cited

U.S. PATENT DOCUMENTS

| | | |
|---|---|---|
| 2012/0017269 A1 | 1/2012 | Cahill |
| 2015/0227749 A1 | 8/2015 | Schincariol et al. |
| 2016/0142409 A1* | 5/2016 | Frei .......................... G06F 21/33 713/176 |
| 2017/0099148 A1 | 4/2017 | Ochmanski et al. |
| 2017/0223005 A1* | 8/2017 | Birgisson .............. H04L 63/083 |
| 2017/0264612 A1 | 9/2017 | Kaushal et al. |
| 2017/0315979 A1* | 11/2017 | Boucher ................ G06F 40/197 |
| 2018/0077138 A1 | 3/2018 | Bansal et al. |
| 2018/0295135 A1* | 10/2018 | Feijoo ................... H04L 63/083 |
| 2018/0302391 A1* | 10/2018 | Jones ..................... G06F 16/284 |
| 2018/0340350 A1* | 11/2018 | Johnson .............. G07C 9/00944 |
| 2019/0342182 A1* | 11/2019 | Dhanabalan .......... G06F 1/3278 |
| 2020/0067903 A1* | 2/2020 | Yegorin ................ H04L 67/562 |
| 2020/0136825 A1 | 4/2020 | Gupta et al. |

OTHER PUBLICATIONS

Extended European Search Report for European Patent Application No. 19213738.8 dated Mar. 23, 2020. 10 pages.
First Office Action for Chinese Patent Application No. 201911280519.9 dated Dec. 3, 2021. 8 pages.
Niruntasukrat et al. Authorization Mechanism for MQTT-based Internet of Things. May 23, 2016, 6 pages.
Intention to Grant for European Patent Application No. 19213738.8 dated Jul. 13, 2023. 40 pages.

* cited by examiner

| Token 120 | |
|---|---|
| IoT Device ID: | |
| Auth: | |
| Signature: | |
| Second service ID: | |
| Valid time period: | |

Payload:
```
{
"cloudiot": {
"dev": "<device_id>",
"loc": "<location>,
"reg": "<registry_id>"
},
"iss": "https://securetoken.com/<project_id>",
"aud": "<project_id>",
"auth_time": <creation_time>,
"user_id": "cloudiot-<device_id>",
"sub": "cloudiot-<device_id>",
"iat": <creation_time>,
"exp": <expiration_time>,
"secondservice": {
"identities": {},
"sign_in_provider": "custom"
}
}
```

SYSTEM AND METHOD FOR DELEGATING AUTHORITY THROUGH COUPLED DEVICES

CROSS-REFERENCE TO RELATED APPLICATIONS

The present application is a divisional of U.S. patent application Ser. No. 16/518,127, filed Jul. 22, 2019, which claims the benefit of the filing date of U.S. Provisional Patent Application No. 62/803,104 filed Feb. 8, 2019, the disclosure of which is incorporated herein by reference.

BACKGROUND

In the Internet of things (IoT), IoT devices are nonstandard computing devices wirelessly connected to a network. By way of example, IoT devices may include lightbulbs that can be turned on or off remotely through the cloud, smart TVs, smart speakers, security cameras, toys, thermostats, household appliances, etc. Typically, such IoT devices do not include screens or keyboards through which to enter control information, access credentials, or other information. Such devices connect to a network, such as a core service, through a particular communication protocol and/or Internet protocol using access credentials, such as identifiers for the device and/or its user. However, the access credentials to the core service are currently incompatible with other cloud services, thereby limiting the use and effectiveness of such IoT devices.

BRIEF SUMMARY

One aspect of the disclosure provides a method of authenticating an Internet of Things (IoT) device having an IoT device identity to a second service that does not natively support the IoT device identity. The method may include receiving, by one or more processors, a request for access to the second service, receiving, by the one or more processors, the IoT device identity, validating, by the one or more processors, the IoT device identity using information associated with an IoT account, generating, by the one or more processors in response to the IoT device identity being valid, an access token usable as a credential for the second service, the token having a valid time window, and providing the access token to the IoT device for use in accessing the second service during the time window without validating a second credential specific to the second service.

According to some examples, generating the access token may include registering the access token with the second service. Registering the access token with the second service may further include exchanging a first token for authenticating the IoT device with the access token from the second service. Receiving the IoT device identity may include receiving the first token, and wherein validating the IoT device identity comprises validating the first token. The first token may be a Java Web Token, and may be signed with a private key, wherein the information associated with the IoT account is a public key of the IoT device stored in association with the IoT account. One or more claims may be inserted into the first token, thereby creating a custom token, wherein the one or more claims restrict access of the IoT device to the second service, such as by limiting a portion of the second service that can be accessed by the IoT device using the access token. According to some examples, the custom token may be signed using the IoT account.

Another aspect of the disclosure provides a system for authenticating an IoT device having an IoT device identity to a second service that does not natively support the IoT device identity. The system may include one or more memories, and one or more processors in communication with the one or more memories. The one or more processors may be configured to receive a request for access to the second service, receive the IoT device identity, validate the IoT device identity using information associated with an IoT account, generate, in response to the IoT device identity being valid, an access token usable as a credential for the second service, the token having a valid time window, and provide the access token to the IoT device for use in accessing the second service during the time window without validating a second credential specific to the second service.

Yet another aspect of the disclosure provides an IoT device having an IoT device identity for accessing a core network, the device including one or more memories, and one or more processors in communication with the one or more memories. The one or more processors may be configured to provide the IoT device identity to a token generation unit, request access to a second service that does not natively support the IoT device identity, receive, in response to the request, an access token to the second service, wherein the access token includes a second service identifier that was exchanged for the IoT device identity, and wherein the access token is valid for a predefined period of time, and access the second service using the access token, without requiring further authentication from the second service. The IoT device may be, for example, an edge device. Accessing the second service may include downloading content from the second service, and may be limited by claims within the access token.

DETAILED DESCRIPTION

The present disclosure provides a system and method for delegating authority to cloud IoT devices, with such delegated authority enabling the cloud IoT devices to access second cloud services. For example, while a cloud IoT device, such as a lightbulb, a kitchen appliance, etc., typically communicates with a core cloud network using a first protocol and set of access credentials that are not compatible with other services, the cloud IoT device may now use those access credentials to obtain a token for accessing the second service within a predefined time window. The second service may be, for example, a mobile development platform such as Firebase®, a file storage system, or any other type of service. The token may be used to access the second service without further authentication. Accordingly, the IoT device can take particular actions, such as downloading files, etc., during the predefined time window. After the predefined time window, the IoT device may no longer access the second service without obtaining another token.

According to one implementation, an endpoint in a token service may authenticate the identity of the IoT device and then exchange it for a temporary access token which permits the IoT device to access supported external services. In this regard, an owner/user of the IoT device grants to the core network service the ability to authorize access by that user's devices to other services outside of the core network service.

According to some examples, the token service may be a generalized token-minting service, including one or more physical backend servers for performing token management and token minting. For example, the token minting and token management may be performed by separate backend servers, or by one backend servers with two separate planes. The token management may include handling a control plane of token-minting, reading and writing token minting settings to a distributed database, access by owners/users/ service accounts, etc. The token minting may include handling a data plane of the tokens, reading token-minting settings from the distributed database and minting tokens, and access by IoT devices.

The tokens may further be generated to include one or more claims or restrictions as to what the IoT device can access using the token. For example, the claims may restrict access to a particular file, database, feature, or other aspect of a service.

Example Systems

Figure 1:
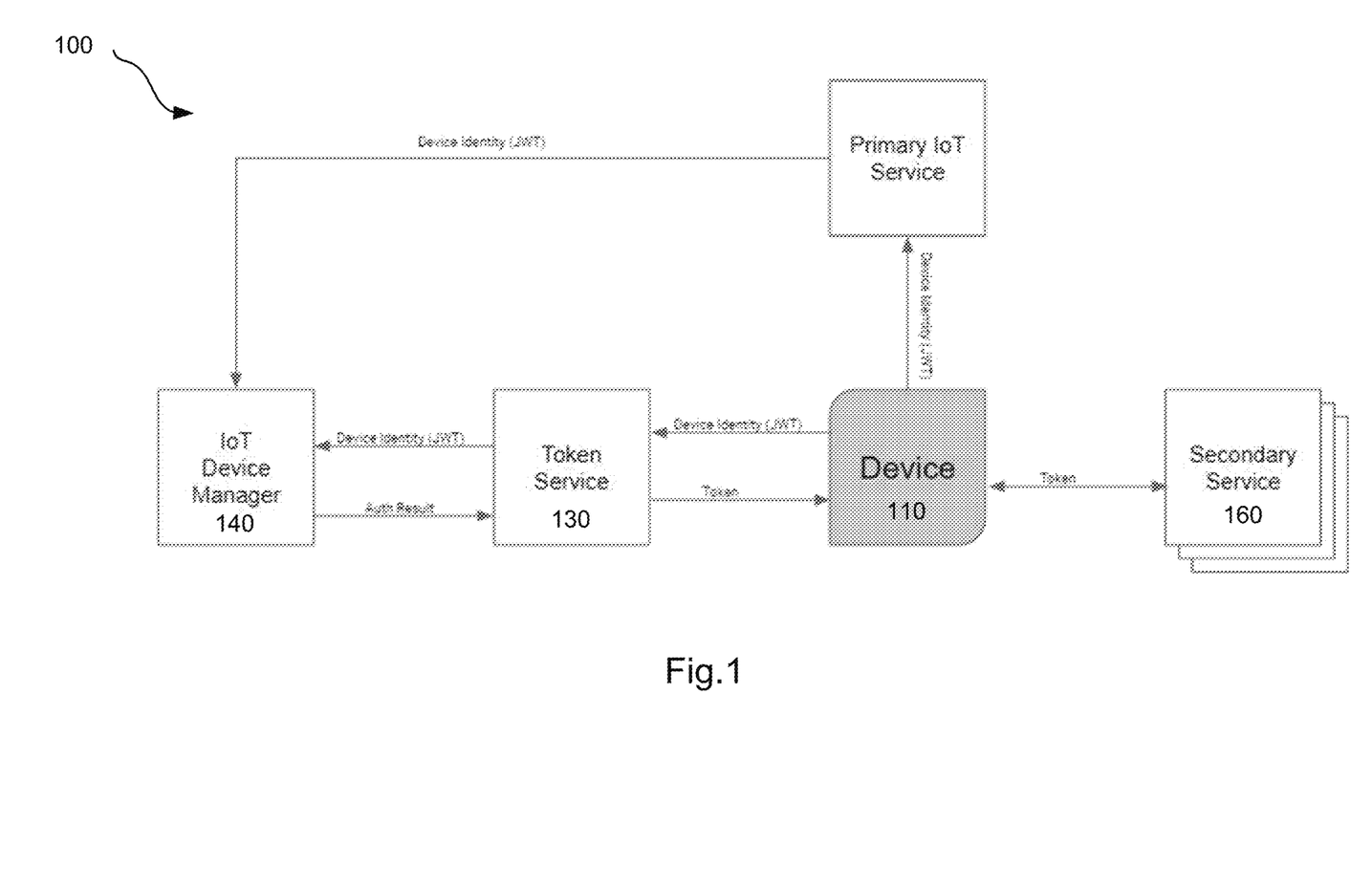
FIG. 1 is a relational diagram illustrating an example system according to aspects of the disclosure.

FIG. 1 illustrates an example system 100, including an IoT device 110. The IoT device 110 may communicate with a primary IoT service 155 for ordinary operation of the IoT device 110. For example, if the IoT device 110 is a smart lightbulb, the primary IoT service 155 may be used to turn the device on or off at particular times. As such, the primary service 155 may provide an interface, such as through an application, for a user. The service may authenticate the device 110 through IoT device manager 140 using a device identity, such as a JSON web token (JWT) or other identifier.

The IoT device 110 further communicates with a token service 130 to obtain an access token 120 for accessing one or more secondary services 160. For example, the IoT device 110 may send its identifier) to the token service 130, which validates the identifier through device manager 140. In some examples, the identifier may be a first token. A second token, such as an access token, is generated at the token service 130 using the identifier, and may be used by the IoT 110 to access the one or more secondary services 160 for a predefined period of time. For example, the identifier or first token may be exchanged for the second access token that is used to access the secondary service 160. Further discussion regarding generating the access token is provided below in connection with FIG. 3.

The IoT device 110 may be any type of IoT device. For example, while the IoT device 110 may be a lightbulb as mentioned above, in other examples the IoT device may be any type of "smart" device adapted for wireless communication with a network and capable of executing instructions. For example, the IoT device may have one or more processors and a memory, as discussed in further detail below with respect to FIG. 6, that enable programming of the device or operation of the device through the network. Some types of IoT devices may include, by way of example only and not limitation, washing machines, pet food feeders, thermostats, wearable electronic devices, cameras, door locks, etc. The IoT device may be a consumer, commercial, industrial, or other type of device.

The access token may be an object or credential that describes a security context for access to the second service 160 by the IoT device 110. For example, the access token may be a customized JSON web token (JWT), or any other type of access token. The access token may include an identifier of the IoT device 110 and/or an identifier of an owner/user of the IoT device 110. Moreover, the access token may include one or more claims or restrictions limiting the scope of access to the second service 160. For example, the claims may limit the device, location, particular information, etc. that may be accessed by the IoT device 110 using the access token. The access token is described in further detail in connection with FIG. 4.

The token service 130 may be, for example, a service application programming interface (API) which defines remote procedure calls or other requests of a token generating unit.

The device manager 140 may be, for example, a processor in communication with a storage service storing information regarding IoT devices. The storage can be of any type of computerized storage capable of storing information accessible by the token service, such as a hard-drive, memory card, ROM, RAM, DVD, CD-ROM, write-capable, and read-only memories. In addition, the storage system may include a distributed storage system where data is stored on a plurality of different storage devices which may be physically located at the same or different geographic locations. The storage may store data, such as unique identifier associated with the IoT devices and/or their users.

The one or more secondary services 160 may be any type of service outside of the core cloud network with which the IoT device 110 typically communicates. For example, the second service 160 may be a backend-as-a-service (BAAS), such as a web or mobile development platform. In other examples, the second service 160 may be a software application, infrastructure, database storage, or any other type of service. In further examples, the access token may be used to access any of a variety of cloud products, such as products for computation, networking, storage, management, security, analytics, artificial intelligence, blockchain, developer tools, etc.

Figure 2:
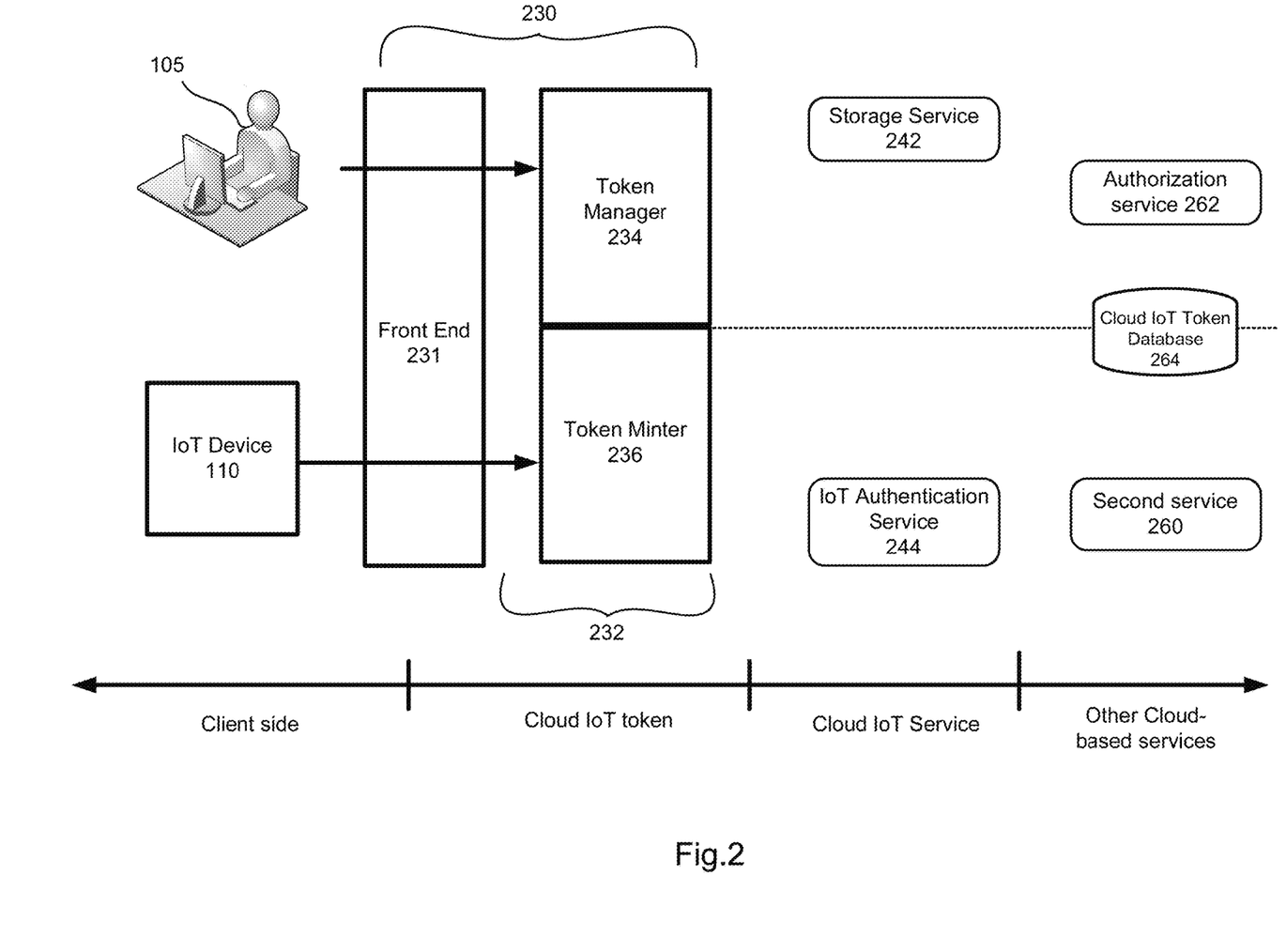
FIG. 2 is an architectural diagram of the example system according to aspects of the disclosure.

FIG. 2 illustrates an example architecture of the system, including further example details regarding the token service.

User 105 owns IoT device 110 on the client side. For example, the IoT 110 operates using an identifier associated with the user 105, such as an identifier linked to an account of the user. The user 105 requests, through front end 231, extended access for the IoT device 110. For example, the user 105 may initiate a request to delegate particular authority to the IoT device 110 to access further services.

As shown in this example, token service 230 may include the front end 231 and token generating unit 232. For example, the front end 231 may be a server that users 105 may access, for example through an interface. The front end 231 is between the client side and the token generating unit 232. The token generating unit 232 may further include a token manager 234 and a token minter 236. While in some examples the token manager 234 and the token minter 236 may be separate processing units, in other examples the token manager 234 and the token minter 236 may be separate planes of the same processing unit.

The token manager 234 may identify token settings, which may be different for each type of token supported by the token service 230. For example, a first type of token may be used for one type of secondary service, while a second type of token may be used for another type of secondary service. The token settings may be stored in a cloud IoT token database 264, which may be any distributed or localized or other database. For example, a table may map a registry resource, such as a device registry identifier, to particular token settings. The token manager 234 writes to and reads from the cloud IoT token database 264. The token manager 234 may further communicate with storage service 242 and authorization service 262. For example, the authorization service 262 may determine if a particular user has permission to take a specific action on a designated resource, such as to access a particular database using a specific device. In making such determination, the authorization service 262 may utilize information, such as account information, stored in the storage service 242.

The token minter 236 may generate access tokens for accessing the second service. For example, the token minter may read token settings from the cloud IoT token database 264. It may further authenticate the IoT device 110 through IoT authentication service 244, for example, using the IoT credentials. The token minter 236 may receive a request, such as through a remote procedure call (RPC), to generate a token for access by the IoT device 110 to a particular second service 260. In response, the token minter 236 may authenticate the identity of the IoT device 110. For example, the token minter 236 may compare an identifier for the IoT device 110 received in the request with an identifier for the IoT device stored in a memory. In one particular example, the token minter 236 may receive the IoT device's JWT-based credentials, signed with the device's private key, and call the IoT Device Authentication Service 244 to authenticate the device 110 and its JWT. It should be understood that a variety of other validation techniques are possible.

Once the device 110 has been successfully authenticated, the token minter 236 may determine if token minting is enabled for the device's registry. For example, users may send requests to the token manager 234 to either enable or disable the ability to mint tokens. This enabling of token-minting is applied to an IoT device registry, such as a collection of devices. When the token minter 236 receives a request from an IoT device to mint a token, it will verify that token-minting was enabled for the device registry to which the device belongs. This may be a setting managed by the token manager 234, and may include a query to the cloud IoT token database 264. The token minter 236 retrieves data from the cloud IoT token database 264 to form the claims, and creates a signed custom token which includes the claims. The token minter 236 may then exchange the signed custom token with an access token specific to the second service 260, and return the access token to the device 110.

Figure 3:
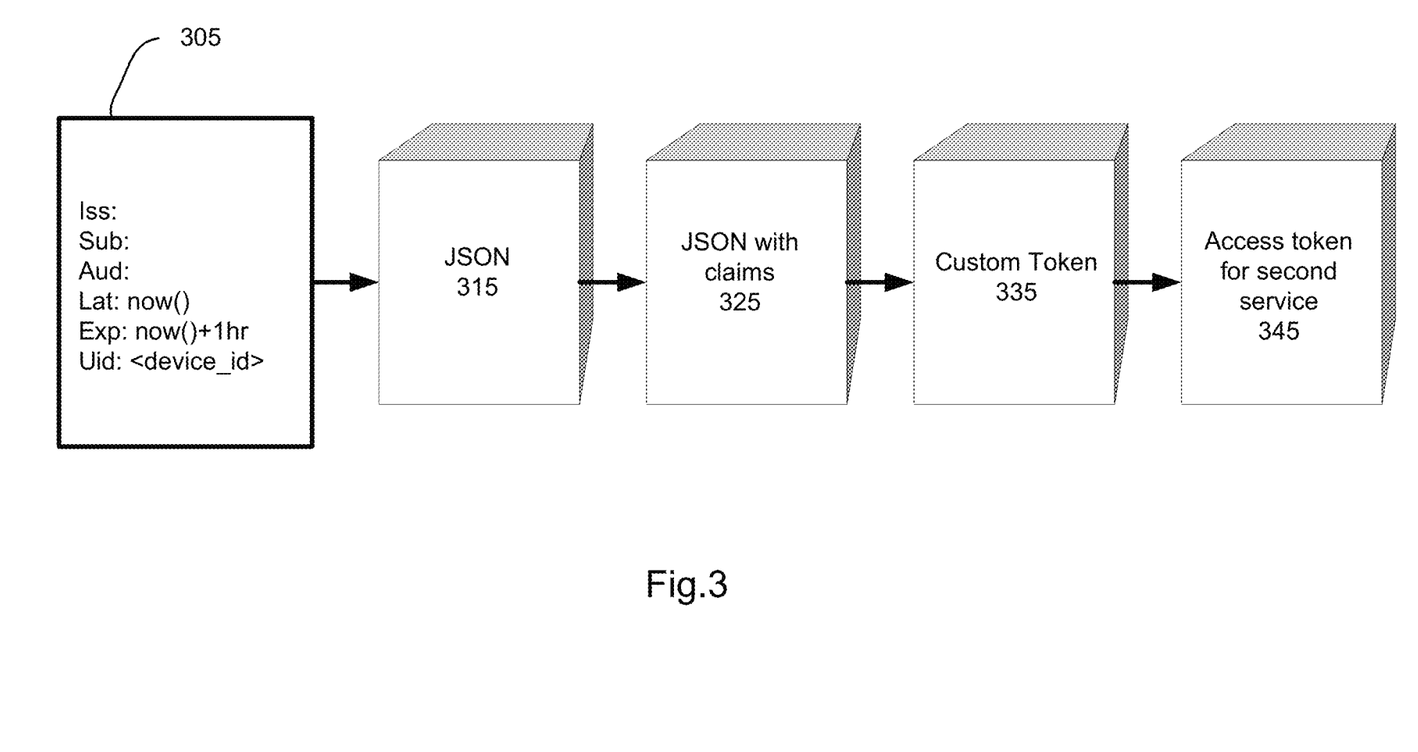
FIG. 3 is an example flow diagram illustrating creation of a token for accessing a second service through an IoT device according to aspects of the disclosure.

FIG. 3 illustrates an example flow for creating an access token for a particular second service. Registered JWT claims 305 are used by various backends in specifying when the JWT for the MT device is valid, when the JWT expires, who the issuer is, etc. For example, such JWT claims may include an "iss" issuer claim that identifies a principal that issued the JWT, a "sub" subject claim that identifies the principal that is the subject of the JWT, and "aud" audience claim that identifies recipients that the JWT is intended for, an "exp" expiration time claim that identifies an expiration time after which the JWT must not be accepted for processing; etc. The JWT may also include a "uid" unique identifier. A JSON object 315 is created, for example, using the identifier for the IoT device 110. While this example utilizes JSON objects for creating the access token, it should be understood that other types of objects may alternatively be used. For example, any type of object that encodes data may be used, such as a protocol buffer. Claims are inserted into the JSON object, thereby creating the JSON with claims 325. The claims are inserted into the JSON in order to restrict the authorization scope of the eventual access token 345. To insert claims, ancillary device data, such as group memberships, bindings, etc., may be retrieved from IoT Storage via a Device Manager Storage Service.

An unsigned custom token 335 is constructed based on a combination of a user identifier or IoT device identifier, with claims data. The unsigned custom token is then signed with an account. For example, the token minter may create a signed custom token by first minting an internal token for an account associated with a customer's project, and then using that internal token to call a cloud identifier database. The internal token is passed as the resource whose key will sign the custom token 335.

The signed custom token 335 may then be used to call an authenticator for the second service, which returns access token 345 for the second service. The access token 345 is returned to the IoT device and authorizes the IoT device to directly access the second service, or any other second service which has granted access to the account and whose claims match the claims in the access token. The access token 345 expires after a period of time, such as several seconds, minutes, hours, etc.

Figure 4:
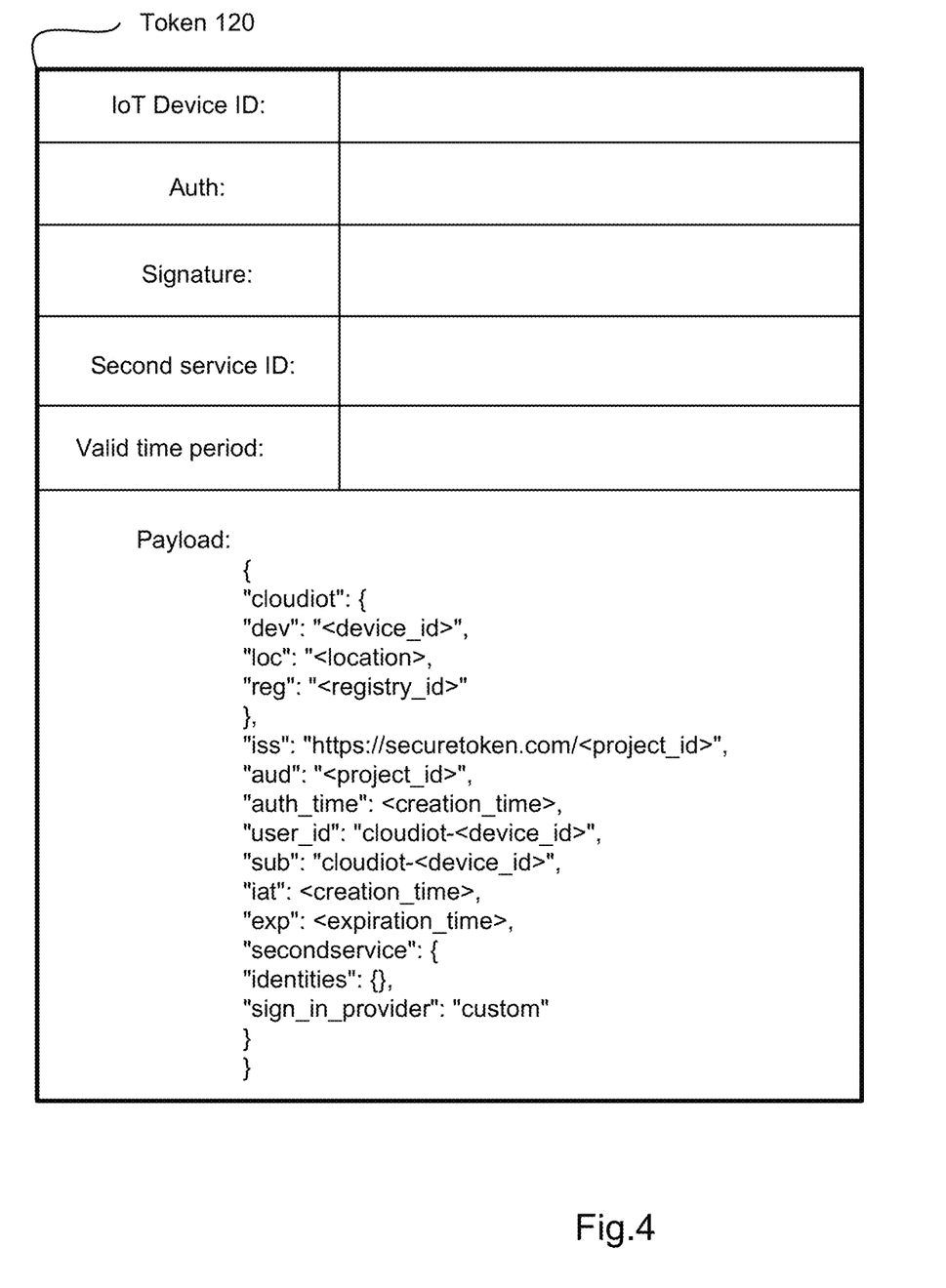
FIG. 4 is a block diagram illustrating an example token for accessing a second service through an IoT device according to aspects of the disclosure.

FIG. 4 illustrates an example access token 120. As shown in this example, the token 120 may include the identifier for the IoT device. This identifier may correspond to the IoT device itself, the user/owner of the IoT device, or both. According to some examples, multiple identifiers may be included, such as separate identifiers for the IoT device, the user, etc.

The access token 120 may further include a time period for which the access token is valid. For example, the access token may designate a first timestamp, such as corresponding to a time the access token was minted or a time the access token was returned to the IoT device. The access token may further designate a length of time after the first timestamp during which the access token is valid. According to other examples, the access token may identify particular times during the day during which the access token is valid.

The access token 120 may further include the claims. For example, the claims may be listed in a payload of the access token.

Figure 5:
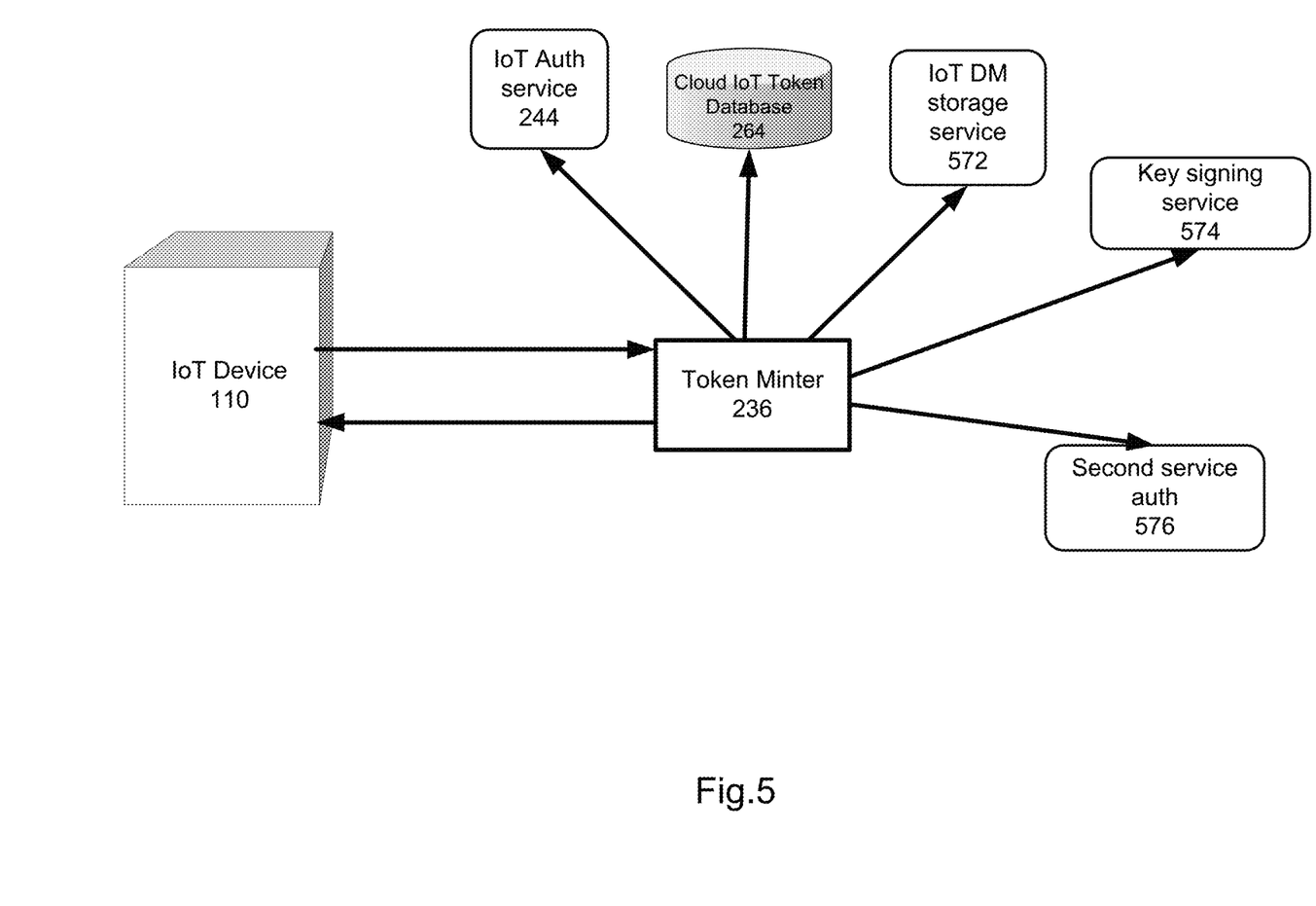
FIG. 5 is a components diagram illustrating communication between various components in creation of the example token of FIG. 4.

FIG. 5 illustrates an example communication diagram among components of the system in generating the access token for accessing the second service by the IoT device 110.

The IoT device 110 provides its credentials to the token minter 236. For example, the IoT device 110 may send its JWT, signed with the device's private key. The token minter 236 calls the IoT Device Authentication Service 244 to authenticate the device 110 and its credentials. Once the device 110 has been successfully authenticated, the token minter 236 may determine whether or not the minting of tokens is enabled for the device's registry. In this regard, the token minter 326 may send a query to the cloud IoT token database 264 to check this setting.

To insert the claims, the token minter 236 may retrieve ancillary device data from IoT storage via the IoT device manager storage service 572. The token minter 236 may now have the unsigned custom JWT, and makes a call to a key signing service 574 to sign the custom JWT.

The signed custom JWT, or custom token, is used to call a second service authenticator 576 for the second service to exchange the custom token for an access token for the second service. According to some examples, a token cache may be implemented to cache access tokens that have not yet expired. This may protect the token minter 236 from devices that repeatedly request access tokens. According to some other examples, an authorization cache may be implemented to cache whether or not the device credentials are valid. The token minter 236 then returns the access token to the device 110, which can use the access token to access the second service for a specified period of time.

Figure 6:
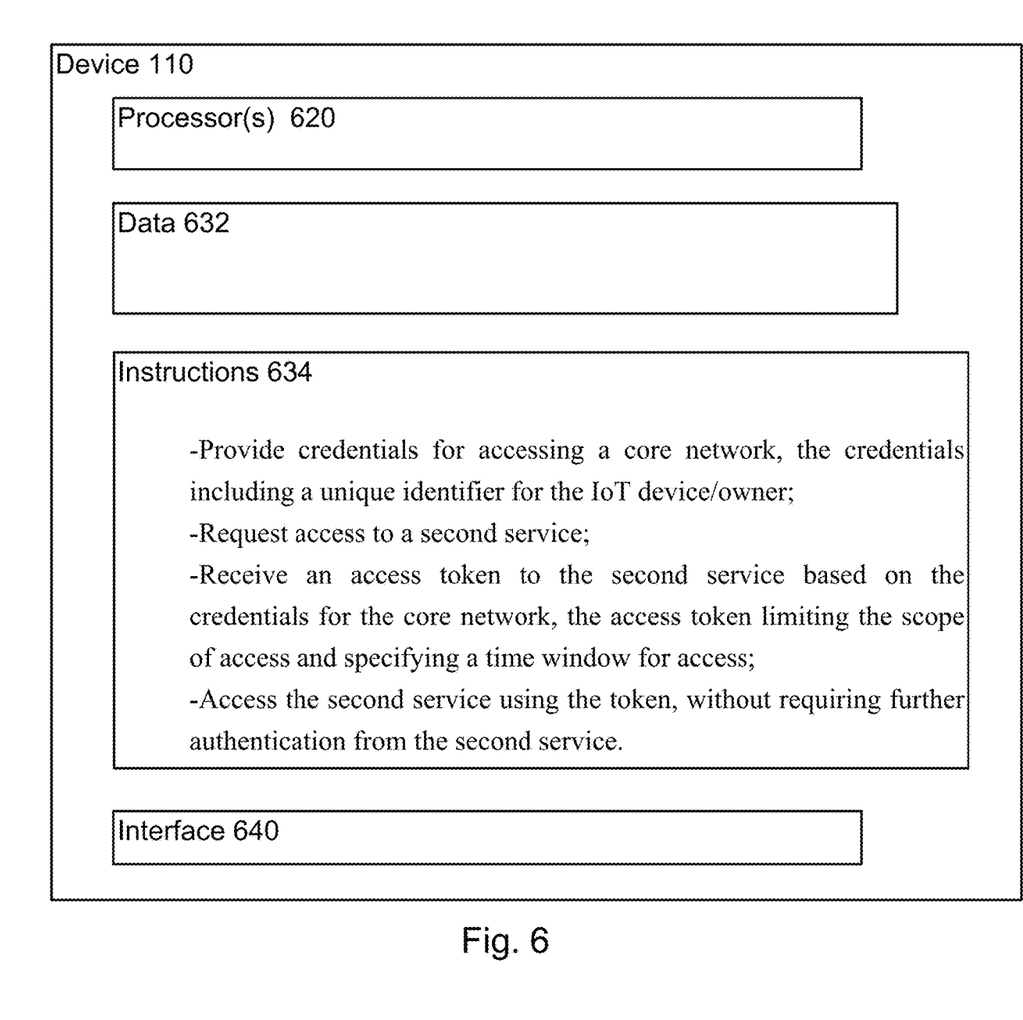
FIG. 6 is a block diagram of an example IoT device according to aspects of the disclosure.

FIG. 6 illustrates an example IoT device 110, including one or more processors 620, memory 630 and other components typically present in smart devices. Memory 630 of the IoT device 110 can store information accessible by the one or more processors 620, including instructions 634 that can be executed by the one or more processors 620.

Memory 630 can also include data 632 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 634 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 632 may be retrieved, stored or modified by the one or more processors 620 in accordance with the instructions 634. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 620 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes.

The IoT device 110 may include a communication interface 640 enabling communication between the IoT device 110 and a network, such as a cloud core network including a token generation unit. The communication interface 640 may further enable communication with other external services and products. The IoT device may communicate with the network and other nodes using various protocols and systems, such that the network can be part of the Internet, World Wide Web, specific intranets, wide area networks, or local networks. The network can utilize standard communications protocols, such as Ethernet, WiFi, HTTP, protocols described in IEEE 802.66, cellular technology (such as GSM, CDMA, UMTS, EV-DO, WiMAX, LTE, etc.) protocols that are proprietary to one or more companies, and various combinations of the foregoing. Although certain advantages are obtained when information is transmitted or received as noted above, other aspects of the subject matter described herein are not limited to any particular manner of transmission of information.

Figure 7:
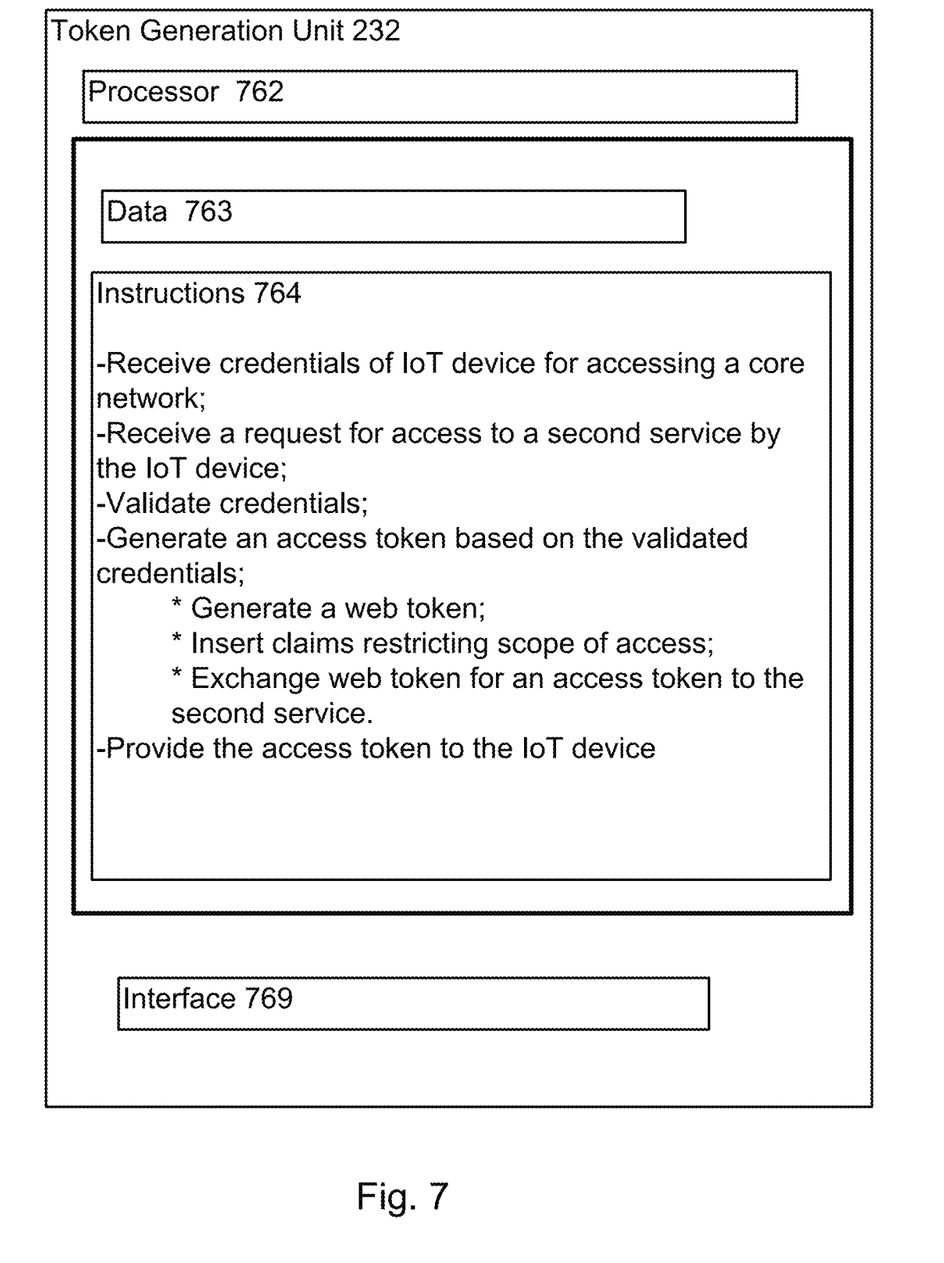
FIG. 7 is a block diagram of an example token generation unit according to aspects of the disclosure.

FIG. 7 is a block diagram of an example token generation unit 232, including a processor 762, memory including data 763 and instructions 764.

The instructions 764 are executable by the processor 762, for example, to perform a method including exchanging credentials of an IoT device for an access token granting the IoT device access to a second service outside of a core network.

The token generation unit 232 further includes an input/output (I/O) interface 769. I/O interface 769 may provide for communication, using analog or digital modulation, between the token generation unit 232 and other devices or networks. The I/O interface 769 may facilitate circuit-switched and/or packet-switched communication. For instance, I/O interface 769 may include a chipset and antenna arranged for wireless communication with a radio access network or an access point. I/O interface 769 may include a wireline interface, such as an Ethernet, Universal Serial Bus (USB), or High-Definition Multimedia Interface (HDMI) port. I/O interface 769 may also include a wireless interface, such as a Wi-Fi, or wide-area wireless interface (e.g., WiMAX or 3GPP Long-Term Evolution (LTE)). Other forms of physical layer interfaces and other types of communication protocols may also be used. Furthermore, I/O interface 769 may comprise multiple physical communication interfaces (e.g., a Wifi interface, a short range wireless interface, and a wide-area wireless interface), and may enable multiple simultaneous connections of different types.

The I/O interface 769 may be used to establish connectivity with one or more other computing devices. For example, the I/O interface 769 may be used to establish connections with IoT devices 110, IoT authentication services 244, cloud IoT token databases 264, second service authenticators 576, and other nodes as discussed above, such as in connection with FIG. 5.

Although FIG. 7 functionally illustrates the processor, memory, and other elements of token generation unit 232 as being within the same block, the processor, computer, computing device, or memory can actually comprise multiple processors, computers, computing devices, or memories that may or may not be stored within the same physical housing. For example, the memory can be a hard drive or other storage media located in housings different from that of the token generation unit 232. Accordingly, references to a processor, computer, computing device, or memory will be understood to include references to a collection of processors, computers, computing devices, or memories that may or may not operate in parallel. For example, the token generation unit 232 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, in the "cloud." Similarly, memory components at different locations may store different portions of instructions 734 and collectively form a medium for storing the instructions. Various operations described herein as being performed by a computing device may be performed by a virtual machine. By way of example, instructions 734 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Example Methods

Further to the example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 8:
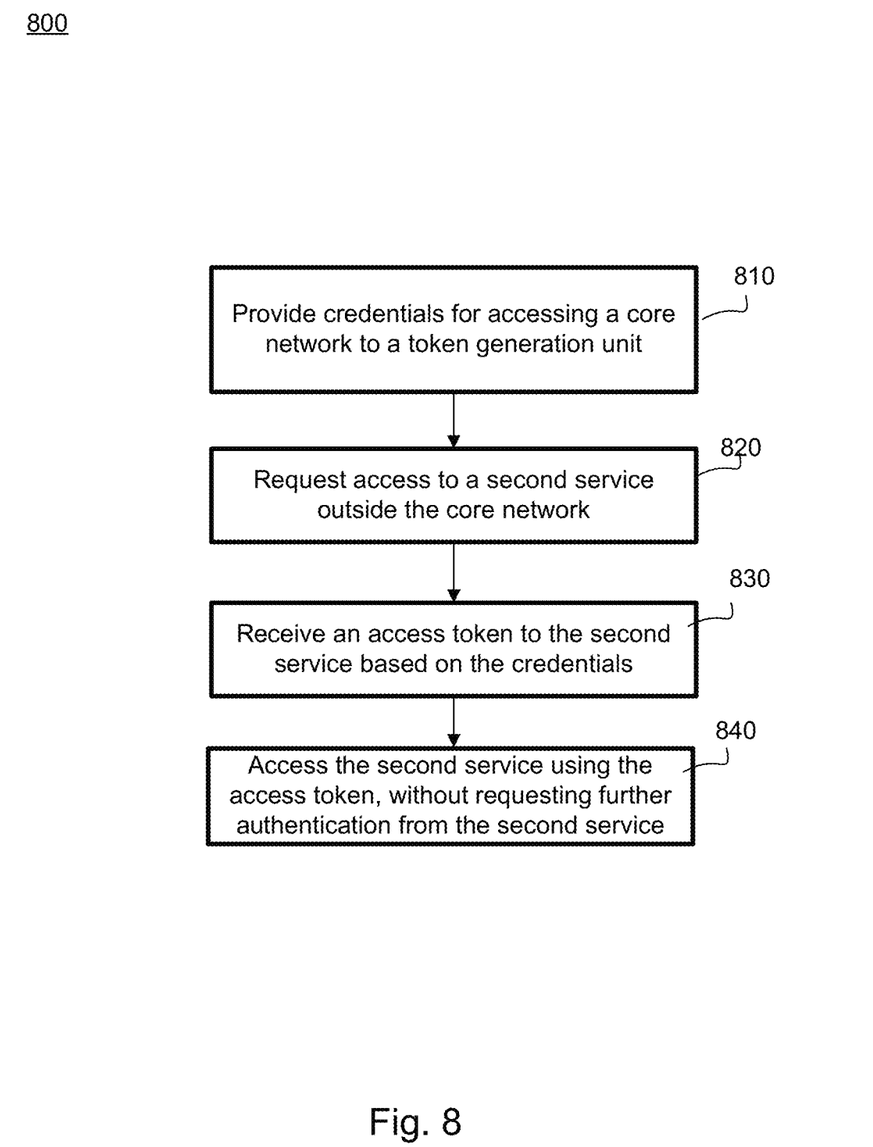
FIG. 8 is a flow diagram illustrating an example method according to aspects of the disclosure.

FIG. 8 is a flow diagram illustrating an example method 800 according to aspects of the disclosure. The method 800 may be performed by, for example, any of a variety of IoT devices.

In block 810, the device provides credentials for accessing a core network. The credentials include a unique identifier specific to the IoT device and/or its owner. Such credentials may be used in standard operation of the IoT device, such as causing it to turn on or off or to perform other functions typical of the IoT device.

In block 820, the IoT device requests access to a second service outside of the core network. For example, the second service may be a BAAS, SAAS, any of a variety of cloud products, etc. It should be understood that the request may be initiated by the owner of the IoT device, such as by submitting the request to a token generation unit through a website or other interface. In this regard, the owner may specify particular IoT devices as well as the particular type of access requested. The owner may further specify a period of time for which the access is requested. In response to such request, the token generation unit may generate an access token, as described in further detail below in connection with FIG. 9.

In block 830, the IoT device receives an access token to the second service based on the credentials for the core network, the access token limiting the scope of access and specifying a time window for access.

Figure 9:
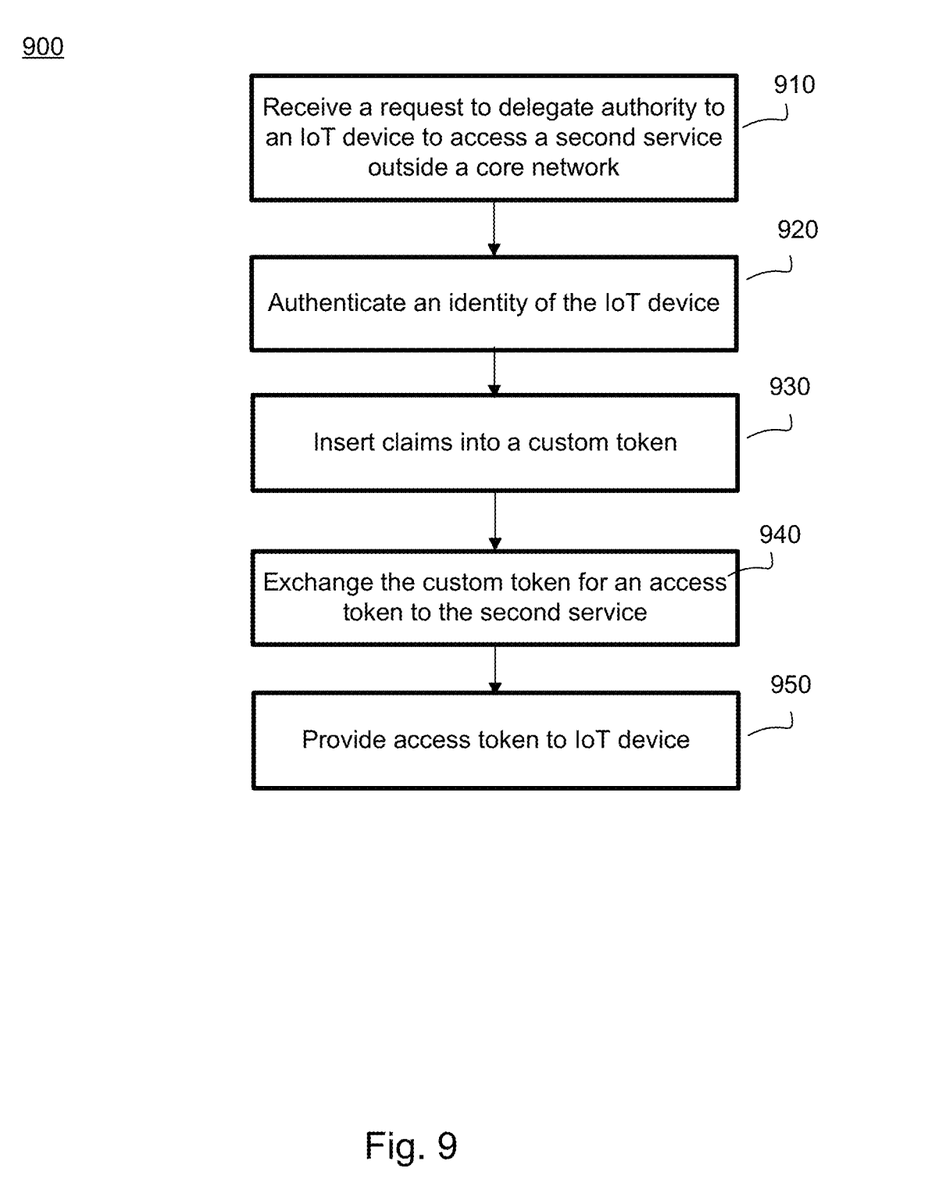
FIG. 9 is a flow diagram illustrating another example method according to aspects of the disclosure.

In block 840, the IoT device accesses the second service using the token, without requiring further validation of the access token by the second service. For example, the second service will validate the access token, but not require any further authentication to permit access by the IoT Device. Accordingly, the IoT Device doesn't need to know or store credentials for the second service. Using only its stored credentials for the token generation unit, it can now access the second service by way of this credentials-for-token exchange. FIG. 9 is a flow diagram illustrating an example method 900 of generating the access token in response to the request to delegate authority to the IoT device. The method 900 may be performed by, for example, the token generation unit 232.

In block 910, the token generation unit receives a request to delegate authority to the IoT device to access the second service outside of the core network. For example, the request may be initiated by an owner of the IoT device through an interface.

In block 920, an identity of the IoT device is validated. For example, credentials of the IoT device may be received, such as if they are included in the request, wherein such credentials are typically used by the IoT device to access the core network. The credentials may include, for example, a unique identifier and a private key. The credentials may take the form of a token, such as a JWT, though it should be understood that the credentials may alternatively take other forms. The credentials may be confirmed through a call to an IoT authentication service to authenticate the device. The IoT authentication service may be part of the core network.

In block 930, the token generation unit inserts claims into a web token, such as the JWT or a web token generated for the IoT device by the token generation unit. The claims restrict a scope of access of the IoT device to the second service. For example, such claims may specify a particular portion of the second service that may be accessed, such as a file, folder, directory, application, etc. Moreover, such claims may restrict what the IoT device can do with the particular portion of the second service. For example, the claims may specify whether the IoT device can download a file, modify a file, etc. Data for generating the claims may be retrieved, for example, from a storage of the IoT core network, such as through an IoT device manager.

The web token with claims may be signed using the credentials of the IoT device. For example, the token generation unit may call to a database of account identifiers for signing the web token using the private key of the IoT device.

In block 940, the signed web token may be exchanged for an access token for accessing the second service. For example, the token generation unit may call an authentication unit of the second service, which returns the access token. Such access token may be valid for a predefined period of time determined by the authentication unit of the second service.

In block 950, the access token may be provided to the IoT device for use in accessing the second service. According to some examples, the access token may also be cached, for example, in case the IoT device requests another access token within the predefined period of time during which the token is valid.

Example Use Cases

The delegation of authority to IoT device as described above may be used in any of a number of example scenarios. While a few of such scenarios are described below, it should be understood that these are merely examples, and are in no way limiting.

According to one implementation, the delegation of authority as described above may be used to download machine learning models on edge devices. For example, the IoT devices may be edge computing devices, such as hardware, software, or a combination. Machine learning may take place in the cloud, on the edge devices, or both. Users may use a machine learning cloud service to train and update learning models in the cloud, and then run the models locally to provide inference at the edge. The edge IoT devices can use delegated authority as described above to securely download the models. For example, the models may be hosted in a second storage service that is outside a core network of the edge IoT device. The edge device may use its identifier to authenticate and download the model regardless of where the model is stored.

According to another implementation, the delegation of authority may be used by edge IoT devices to use and update docker images for IoT applications. The IoT device may authenticate to a container registry and download a user-specified container. Accordingly, users can develop an application once and deploy it to many devices automatically.

According to another implementation, the delegation of authority may be used to provide quality assurance in a manufacturing context. For example, products on an assembly line may be inspected with cameras having a rapid image capture rate, where each image needs to be analyzed. An edge IoT device may be used to make this inference fast at the edge using machine learning. To continue to train the best models, medium-confidence data may continually be labeled. Accordingly, the images may be uploaded by the edge IoT device, using delegated authority, to a second storage service or a machine learning service, for example, for manual labelling to improve the model. The model may then be downloaded to the edge IoT device using the delegated authority.

According to yet another implementation, the delegation of authority may be used by an IoT device to securely download firmware files without exposing the files to the public. The IoT device may use its own identity to authenticate and authorize the download of the file.

Yet another example implementation relates to internet-connected cameras, where video footage may be stored in the cloud and accessed for analysis by the owner of the footage. To maintain security, devices may securely authenticate and then securely store files in a second storage service.

According to another example implementation, the delegation of authority to IoT device may provide direct access by the IoT devices to second services, such as for streaming content for applications such as speech-to text, natural language processing, translation, vision, etc. For example, user may wish to stream audio in a speech-to-text API, or to upload videos to a video processing API. Using a single API key across many different devices is insecure. However, the device may user their IoT credentials for accessing the core network in exchange for a temporary access token to directly connect to the cloud APIs.

The example systems and methods described above are beneficial in that they provide for secure, seamless access of additional cloud services and products by IoT devices. In this regard, communication among devices is increased in a secure way. Moreover, devices may be updated more readily, and the functions and tasks performed by IoT devices may be significantly expanded.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An Internet of Things (IoT) device having an IoT device identity for accessing a core network, the device comprising:
   one or more memories;
   one or more processors in communication with the one or more memories, the one or more processors configured to:
      provide, to a token generation unit, access credentials for an operation of the IoT device in the core network;
      request access to a second service that does not natively support the IoT device identity, wherein the access credentials for the operation of the IoT device are not compatible with the second service and the second service is a service outside of the core network;
      receive, in response to the request, an access token to the second service,
      wherein a custom token, generated using the access credentials and including one or more claims limiting a scope of access by the IoT device to the second service, was exchanged for the access token, and wherein the access token includes the one or more claims, and is valid for a predefined period of time; and
      access the second service using the access token, without requiring further authentication from the second service.

2. The IoT device of claim 1, wherein the IoT device is an edge device.

3. The IoT device of claim 1, wherein accessing the second service comprises downloading content from the second service.

4. The IoT device of claim 1, wherein accessing the second service is limited by the one or more claims within the access token.

5. The IoT device of claim 4, wherein the one or more claims limit access based on location.

6. The IoT device of claim 4, wherein the one or more claims limit information that may be accessed by the IoT device.

7. The IoT device of claim 1, wherein accessing the second service comprises accessing a mobile development platform.

8. The IoT device of claim 1, wherein accessing the second service comprises accessing a cloud product.

9. The IoT device of claim 1, wherein requesting access comprises transmitting a remote procedure call.

10. A method, comprising:
    providing, by an Internet of Things (IoT) device to a token generation unit, access credentials for an operation of the IoT device in a core network;
    requesting, by the IoT device, access to a second service that does not natively support an IoT device identity of the IoT device, wherein the access credentials for the operation of the IoT device in the core network are not compatible with the second service and the second service is a service outside of the core network;
    receiving, by the IoT device in response to the request, an access token to the second service, wherein a custom token, generated using the access credentials and including one or more claims limiting a scope of access by the IoT device to the second service, was exchanged for the access token, and wherein the access token includes the one or more claims, and is valid for a predefined period of time; and accessing, by the IoT device, the second service using the access token, without requiring further authentication from the second service.

11. The method of claim 10, wherein the IoT device is an edge device.

12. The method of claim 10, wherein accessing the second service comprises downloading content from the second service.

13. The method of claim 10, wherein accessing the second service is limited by the one or more claims within the access token.

14. The method of claim 13, wherein the one or more claims limit access based on location.

15. The method of claim 13, wherein the one or more claims limit information that may be accessed by the IoT device.

16. The method of claim 10, wherein accessing the second service comprises accessing a mobile development platform.

17. The method of claim 10, wherein accessing the second service comprises accessing a cloud product.

18. The method of claim 10, wherein requesting access comprises transmitting a remote procedure call.

* * * * *